(12) United States Patent
Cheng et al.

(10) Patent No.: US 7,654,741 B2
(45) Date of Patent: Feb. 2, 2010

(54) ROTATABLE SUPPORTING MODULE AND GANTRY APPARATUS HAVING SAME

(75) Inventors: Chen-Hsing Cheng, Hsinchu (TW); Shing-I Hu, Hsinchu (TW)

(73) Assignee: ICF Technology Co., Ltd., Hsinchu (TW)

( * ) Notice: Subject to any disclaimer, the term of this patent is extended or adjusted under 35 U.S.C. 154(b) by 406 days.

(21) Appl. No.: 11/309,857

(22) Filed: Oct. 13, 2006

(65) Prior Publication Data

US 2007/0211981 A1   Sep. 13, 2007

(30) Foreign Application Priority Data

Mar. 10, 2006   (TW) .............................. 95108166 A

(51) Int. Cl.
*F16C 29/06* (2006.01)
(52) U.S. Cl. .................. 384/45; 384/9; 384/57
(58) Field of Classification Search .................. 384/9, 384/38, 43–45, 48, 57
See application file for complete search history.

(56) References Cited

U.S. PATENT DOCUMENTS

| 5,290,106 | A | * | 3/1994 | Ichida ........................ 384/45 |
| 5,388,913 | A | * | 2/1995 | Cawley et al. ................ 384/38 |
| 5,711,287 | A | * | 1/1998 | Speer ....................... 125/16.01 |
| 6,155,716 | A | * | 12/2000 | Okamura et al. .............. 384/48 |
| 6,402,381 | B1 | * | 6/2002 | Shirai et al. .................... 384/45 |
| 7,223,018 | B2 | * | 5/2007 | Kanehira ....................... 384/9 |

FOREIGN PATENT DOCUMENTS

TW                323785         12/1997

\* cited by examiner

*Primary Examiner*—Thomas R Hannon
(74) *Attorney, Agent, or Firm*—Clifford O. Chi

(57) ABSTRACT

An exemplary rotation module configured for a gantry apparatus includes a rotary plate, a base, and a bearing. The rotary plate has a through hole. The base is arranged in the through hole. The bearing is arranged between the rotary plate and the base. The bearing includes an inner race and an outer race rotatable relative to the inner race. The inner race is securely coupled to the base and the outer race is securely coupled to the rotary plate, whereby the rotary plate is rotatable relative to the base. A gantry apparatus are also provided.

15 Claims, 8 Drawing Sheets

ROTATABLE SUPPORTING MODULE AND GANTRY APPARATUS HAVING SAME

TECHNICAL FIELD

The present invention relates to gantry apparatuses, and more particularly to a rotatable supporting module for a gantry apparatus and a gantry apparatus having the rotatable supporting module that can prevent a cross bar thereof from being damaged.

DESCRIPTION OF RELATED ART

Gantry apparatuses are becoming widely used. Referring to FIG. 8, a gantry apparatus 1 in accordance with a related art is shown. The apparatus 1 includes a left guideway 2, a right guideway 3, a cross bar 4 having two opposite ends, a left slider 5 arranged on the left guideway 2, a right slider 6 arranged on the right guideway 3, a left driver 7, and a right driver 8. One end of the cross bar 4 is mounted on the left slider 5 and the other end of the cross bar 4 is mounted on the right slider 6. The left slider 5 is driven by the left driver 7 thereby moving the cross bar 4 along the left guideway 2. The right slider 6 is driven by the right driver 8 thereby moving the cross bar 4 along the right guideway 3. When the left slider 5 moves non-synchronously with the right slider 6, the cross bar 4 will tilt and be damaged.

What is needed, therefore, is a rotatable supporting module and a gantry apparatus having same that can prevent a cross bar thereof being damaged.

SUMMARY

In an embodiment, a rotatable supporting module configured (i.e., structured and arranged) for a gantry apparatus includes a rotary plate, a base, and a bearing. The rotary plate has a through hole. The base is arranged in the through hole. The bearing is arranged between the rotary plate and the base. The bearing includes an inner race and an outer race rotatable relative to the inner race. The inner race is securely coupled to the base and the outer race is securely coupled to the rotary plate, thus allowing the rotary plate to be rotatable relative to the base.

In another embodiment, a gantry apparatus includes a first guideway and a second guideway arranged parallel with each other, the rotatable supporting module mounted on the first guideway, a slidable and rotatable supporting module slidably mounted on the second guideway, and a cross bar having opposite ends mounted on the rotatable supporting module and the slidable and rotatable supporting module. The slidable and rotatable supporting module includes the rotatable supporting module, and a slidable plate, and a sliding bearing. The sliding bearing includes a first elongated part and a second elongated part juxtaposed with each other. The first elongated part is slidably engaged with the second elongated part and the first elongated part is securely coupled to the rotary plate. The second elongated part is securely coupled to the slidable plate, whereby the slidable plate is slidable along a lengthwise direction of the sliding bearing.

Other advantages and novel features will become more apparent from the following detailed description of the present rotatable supporting module and gantry apparatus having same when taken in conjunction with the accompanying drawings.

BRIEF DESCRIPTION OF THE DRAWINGS

The components in the drawings are not necessarily drawn to scale, the emphasis instead being placed upon clearly illustrating the principles of the present invention. Moreover, in the drawings, like reference numerals designate corresponding parts throughout the several views.

DETAILED DESCRIPTION OF EMBODIMENTS

Figure 1:
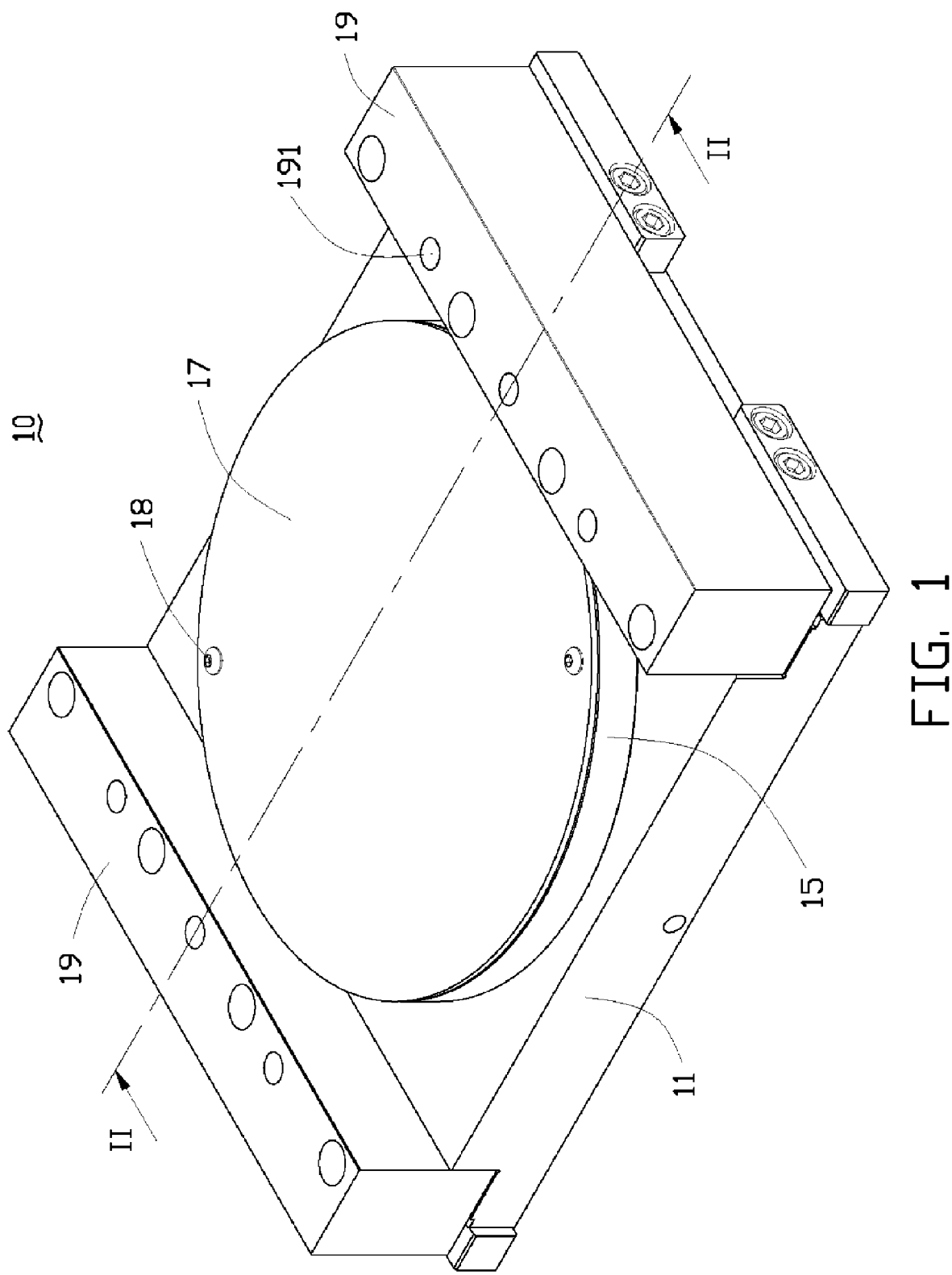
FIG. 1 is an isometric view of a rotatable supporting module in accordance with a first embodiment.

Reference will now be made to the drawing figures to describe the embodiments of the present rotatable supporting module and gantry apparatus with same in detail.

Figure 2:
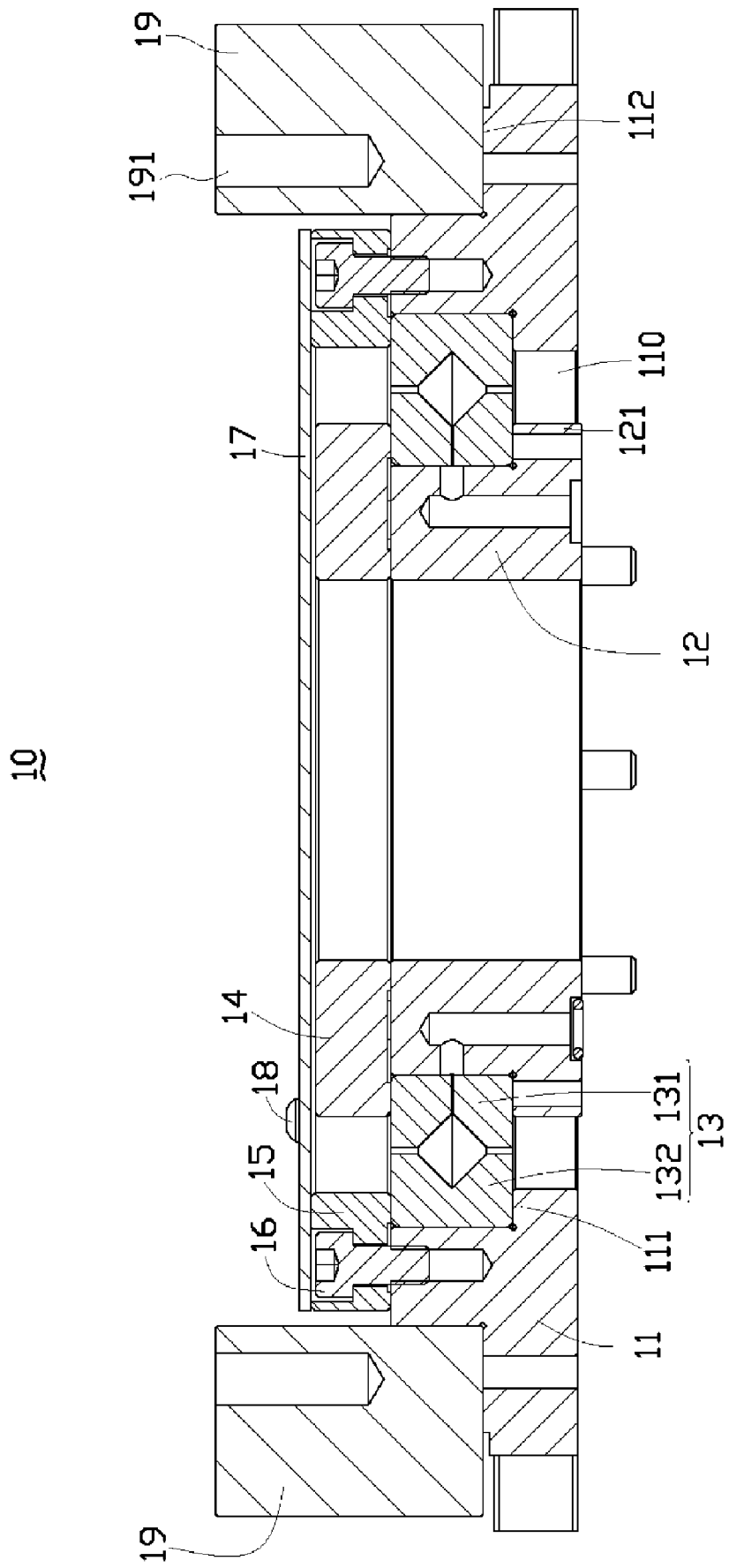
FIG. 2 is a cross-sectional view of the rotatable supporting module, taken along the line 11-11 shown in FIG. 1.
Figure 3:
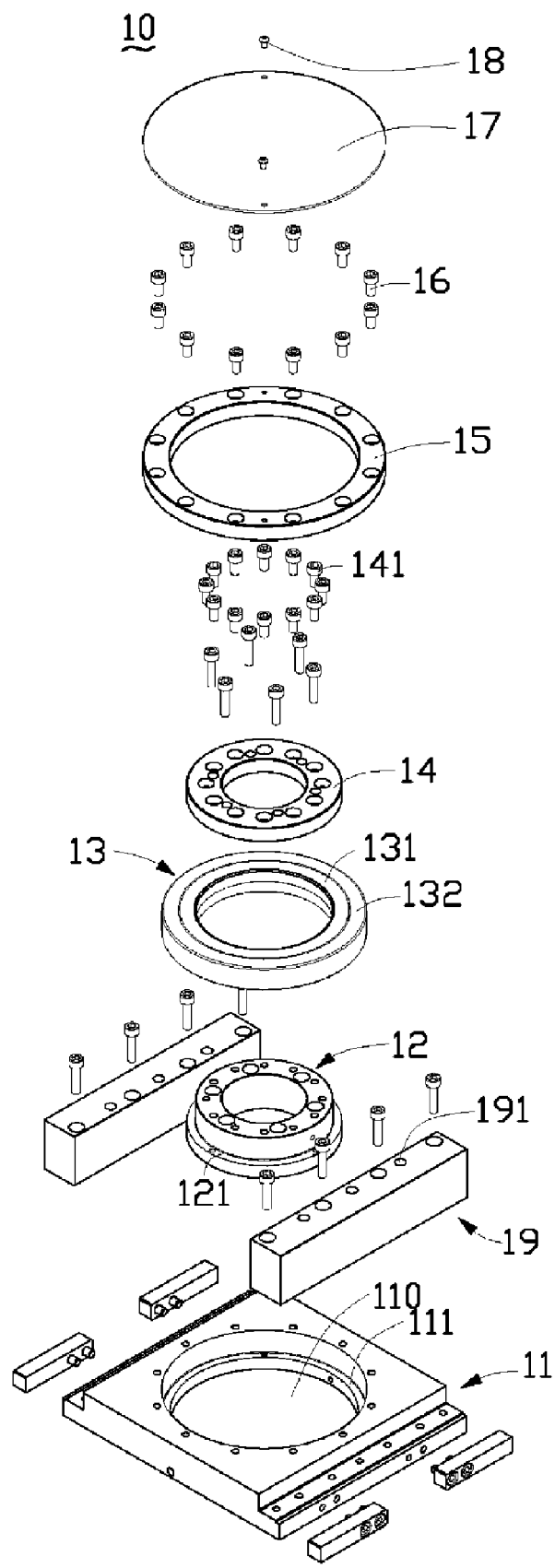
FIG. 3 is an exploded isometric view of the rotatable supporting module shown in FIG. 1.

Referring to FIGS. 1 to 3, a rotatable supporting module 10 in accordance with a first embodiment is shown. The rotatable supporting module 10 includes a rotary plate 11, a base 12, a bearing 13, a first holder 14, a second holder 15, a cover 17, and two connecting blocks 19.

The rotary plate 11 includes a through hole 110 defined therein, an inner flange 111, and two opposite step portions 112. The inner surface of the rotary plate 11 that defines the through hole 110 extends radially to form the flange 111. Two opposite ends of the rotary plate 11 respectively define the two step portions 112.

Each connecting block 19 has a plurality of bolt holes 191. One of the connecting blocks 19 is mounted on one step portion 112 and the other connecting block 19 is mounted on the other step portion 112. One end of a cross bar 43 having opposite two ends (shown in FIG. 7) is connected to the rotary plate 11 through the connecting blocks 19 and some screws screwed into the bolt holes 191.

The base 12 is a cylinder shape and is arranged in the through hole 110. The outer surface of the base 12 extends radially to form a flange 121.

The bearing 13 is arranged between the rotary plate 11 and the base 12. The bearing 13 includes an inner race 131 and an outer race 132. The inner race 131 is coaxially aligned with the outer race 132. The inner race 131 is rotatable relative to the outer race 132. The inner race 131 is arranged on the flange 121 and mounted on the base 12 through engagement between the first holder 14 and some screws 141. The outer race 132 is arranged on the flange 111 and mounted on the rotary plate 11 through engagement between the second holder 15 and some screws 16. Therefore, the rotary plate 11 can rotate around the base 12. Thus, the cross bar 43 can rotate around the base 12.

The cover 17 is held on the second holder 15 by some screws 18. The cover 17 can prevent the dust outside falling into the rotatable supporting module 10.

Figure 4:
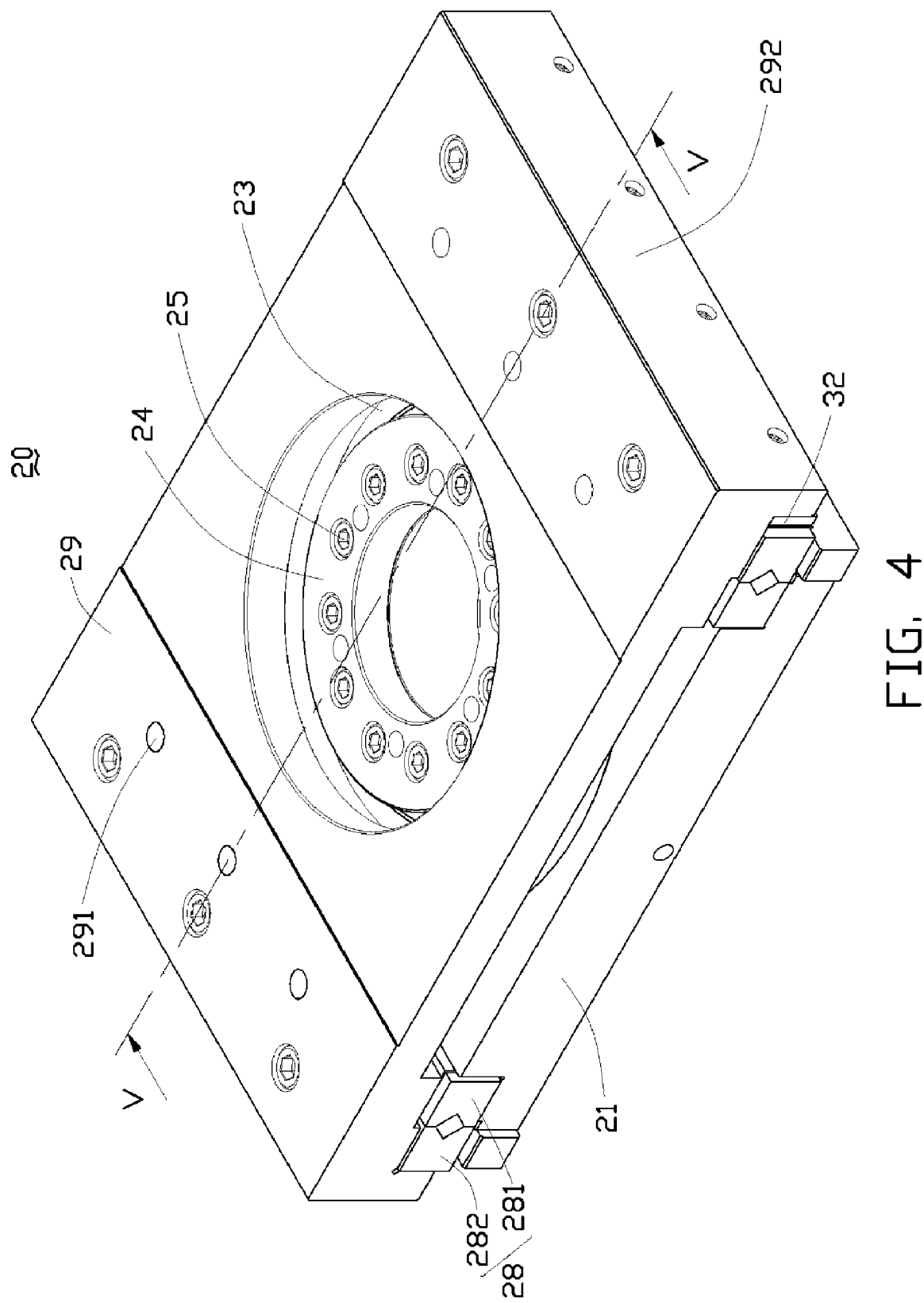
FIG. 4 is an isometric view of a slidable and rotatable supporting module in accordance with a second embodiment.
Figure 5:
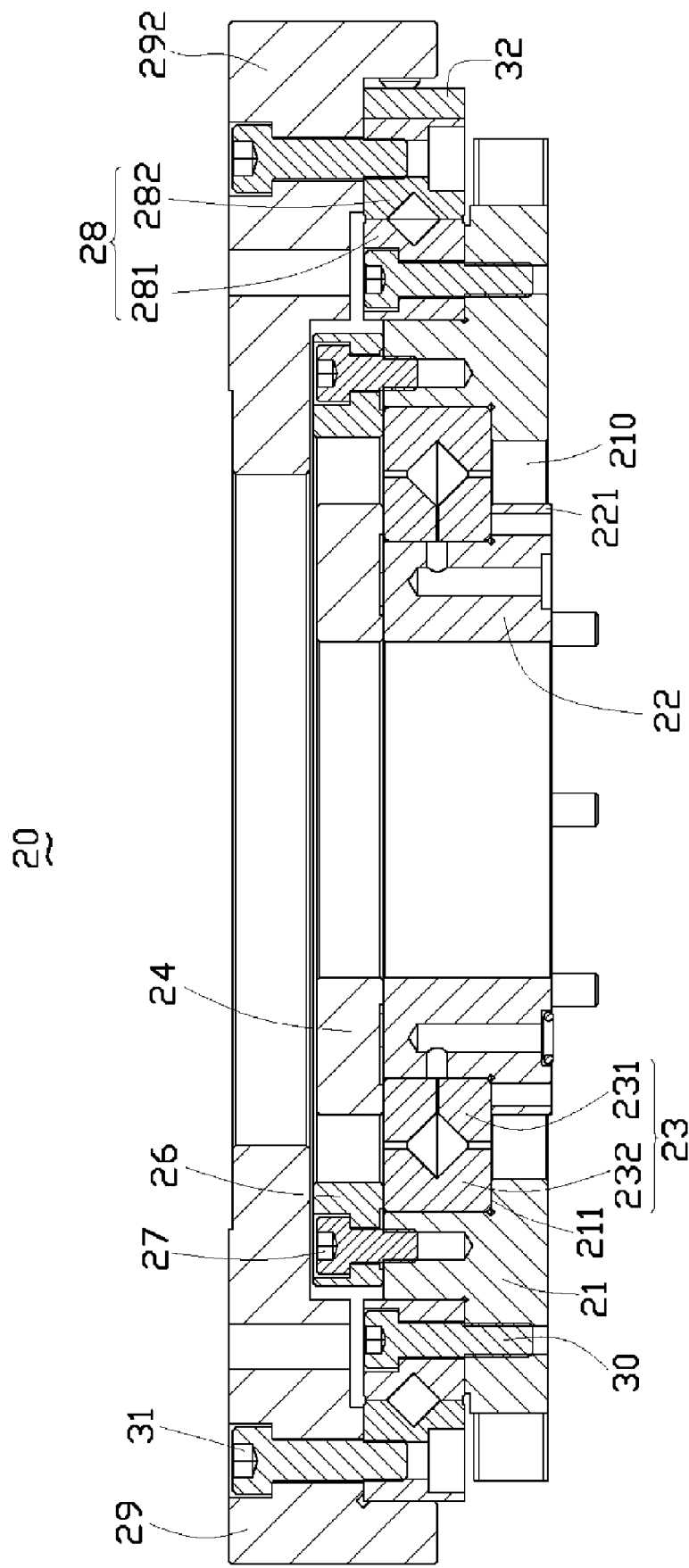
FIG. 5 is a cross-sectional view of the slidable and rotatable supporting module, taken along the line V-V shown in FIG. 4.
Figure 6:
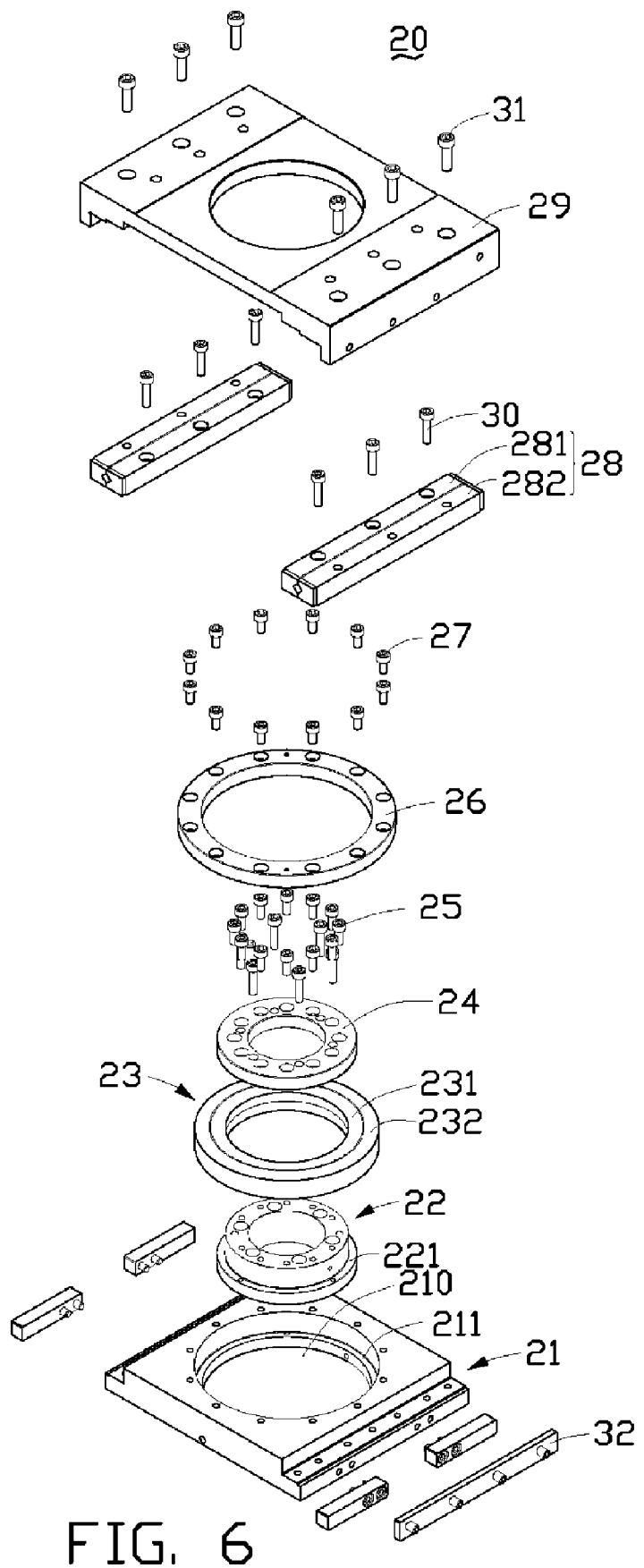
FIG. 6 is an exploded isometric view of the slidable and rotatable supporting module shown in FIG. 4.

Referring to FIGS. 4 to 6, a slidable and rotatable supporting module 20 in accordance with a second embodiment is shown. The slidable and rotatable supporting module 20 includes a rotary plate 21, a base 22, a bearing 23, a first holder 24, a second holder 26, a sliding bearing 28, a slidable plate 29, and a locking plate 32.

The rotary plate 21 includes a through hole 210 defined therein and has a flange 211. The inner surface of the rotary plate 21 that defines the through hole 210 extends radially to form the flange 211.

The base 22 is a cylinder shape and is arranged in the through hole 210 and has a flange 221.

The bearing 23 is arranged between the rotary plate 21 and the base 22. The bearing 23 includes an inner race 231 and an outer race 232. The inner race 231 is coaxially aligned with the outer race 232. The inner race 231 is rotatable relative to the outer race 232. The inner race 231 is arranged on the flange 221 and mounted on the base 22 through engagement between the first holder 24 and some screws 25. The outer race 232 is arranged on the flange 211 and mounted on the rotary plate 21 through engagement between the second holder 26 and some screws 27. Therefore, the rotary plate 21 can rotate around the base 22.

The sliding bearing 28 is arranged between the slidable plate 29 and the rotary plate 21. The sliding bearing 28 includes an inner member 281 and an outer member 282. The inner member 281 is slidable relative to the outer slidable member 282. The inner member 281 is mounted on the rotary plate 21 by some screws 30. The outer member 282 is mounted on the slidable plate 29 by some screws 31. Therefore, the slidable plate 29 can move lengthwise along the sliding bearing 28. The inner member 281 does not touch the slidable plate 29, thus there is little friction force between the inner member 281 and the slidable plate 29.

The slidable plate 29 has a plurality of bolt holes 291 thereon and an inner sidewall 292 at the end thereof. The locking plate 32 locks the outer member 282 to the inner sidewall 292, thus securely mounting the outer member 282 on the slidable plate 29. The other end of the cross bar 43 (shown in FIG. 7) is connected to the slidable plate 29 by some screws screwed into the bolt holes 291. This allows the cross bar 43 to slide lengthwise along the sliding bearing 28 and rotate around the base 22.

Figure 7:
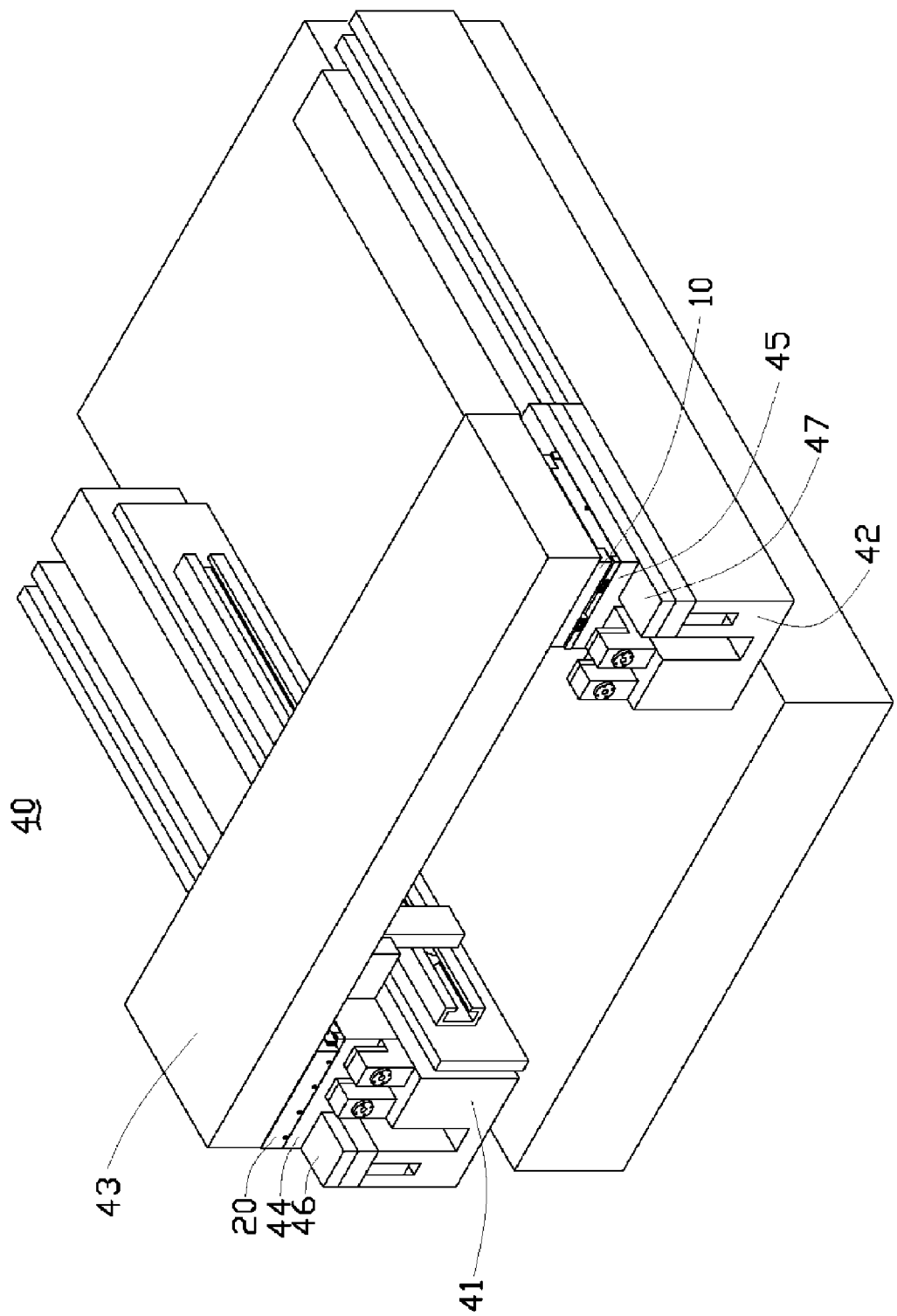
FIG. 7 is an isometric view of a gantry apparatus in accordance with a third embodiment.
Figure 8:
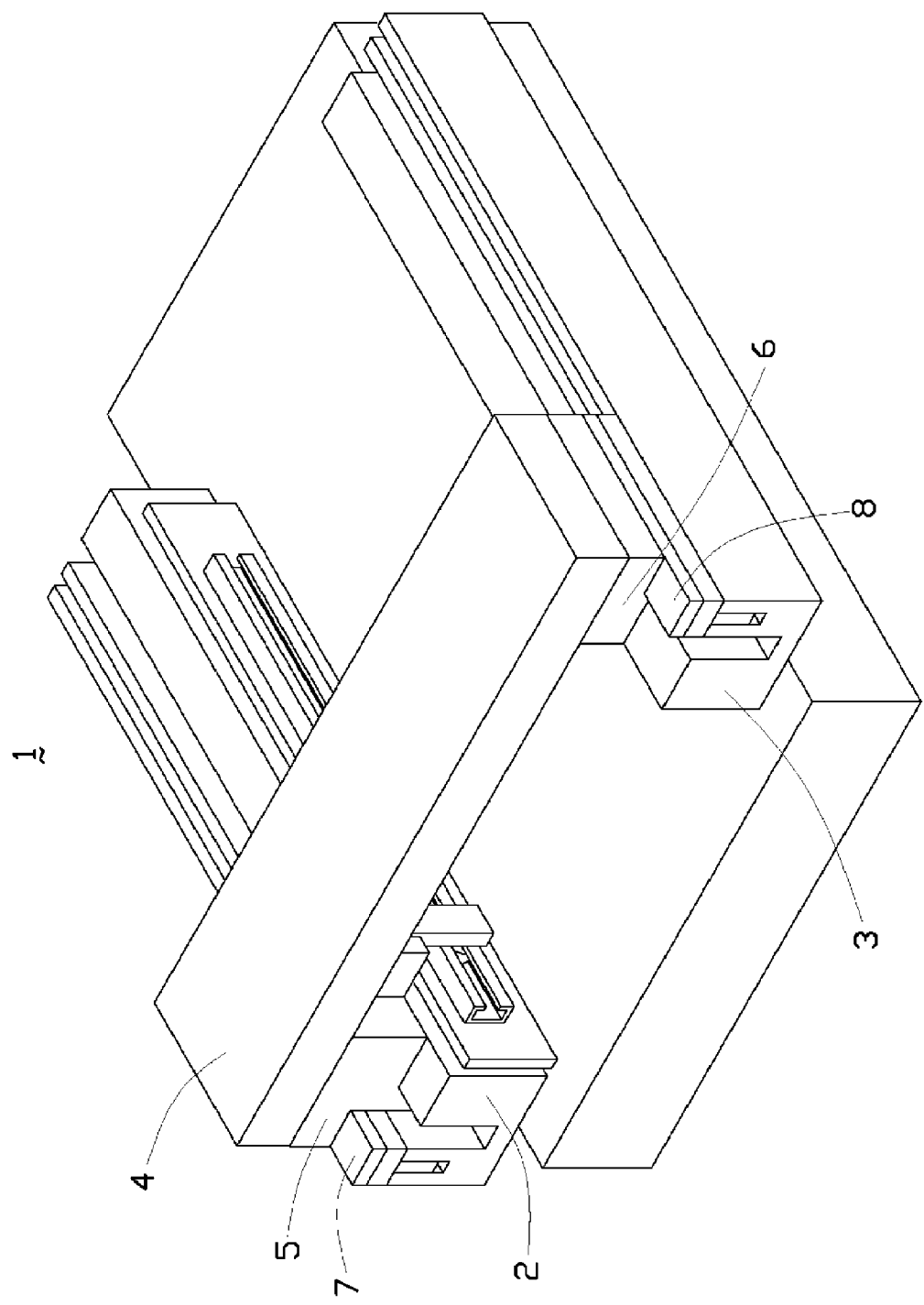
FIG. 8 is an isometric view of a typical gantry apparatus.

Referring to FIG. 7, a gantry apparatus 40 in accordance with a third embodiment is shown. The apparatus 40 includes the rotatable supporting module 10, the slidable and rotatable supporting module 20, a left guideway 41, a right guideway 42 parallel with the left guideway 41, and the cross bar 43.

A left slider 44 is arranged on the left guideway 41 and the slidable and rotatable supporting module 20 is mounted thereon. A left driver 46 moves the slidable and rotatable supporting module 20 through the left slider 44. One end of the cross bar 43 is mounted on the slidable and rotatable supporting module 20.

A right slider 45 is arranged on the right guideway 42 and the rotatable supporting module 10 is mounted thereon. A right driver 47 moves the rotatable supporting module 10 through the right slider 45. The other end of the cross bar 43 is mounted on the rotatable supporting module 10.

The cross bar 43 can rotate around the rotatable supporting module 10 and slide along the sliding bearing 28 of the slidable and rotatable supporting module 20. When the slidable and rotatable supporting module 20 moves with the rotatable supporting module 10 non-synchronously, the cross bar 43 slides a distance along the sliding bearing 28 of the slidable and rotatable supporting module 20 and rotates a small angle around the base 12 of the rotatable supporting module 10. A torsion force that can damage the cross bar 43 is thus released. Thus, the cross bar 43 cannot be damaged.

Although the present invention has been described with reference to specific embodiments, it should be noted that the described embodiments are not necessarily exclusive, and that various changes and modifications may be made to the described embodiments without departing from the scope of the invention as defined by the appended claims.

What is claimed is:

1. A rotatable supporting module configured for a gantry apparatus, comprising:
    a rotary plate defining a through hole;
    a base arranged in the through hole;
    a bearing arranged between the rotary plate and the base, the bearing including an inner race and an outer race rotatable relative to the inner race, the inner race being securely coupled to the base, the outer race being securely coupled to the rotary plate, thus allowing the rotary plate to be rotatable relative to the base;
    a slidable plate; and
    a sliding bearing including a first elongated part and a second elongated part juxtaposed with each other, the first elongated part being slidably engaged with the second elongated part, the first elongated part being securely coupled to the rotary plate, the second elongated part being securely coupled to the slidable plate, whereby the slidable plate is slidable along a lengthwise direction of the sliding bearing.

2. The rotatable supporting module as claimed in claim 1, further comprising an inner race holder, the inner race being securely coupled to the base using the inner race holder.

3. The rotatable supporting module as claimed in claim 1, further comprising an outer race holder, the outer race being securely coupled to the rotary plate using the outer race holder.

4. The rotatable supporting module as claimed in claim 3, further comprising a cover mounded on the outer race holder.

5. The rotatable supporting module as claimed in claim 1, further comprising two connecting blocks mounted on the rotary plate.

6. The rotatable supporting module as claimed in claim 1, further comprising an inner race holder, the inner race being securely coupled to the base using the inner race holder.

7. The rotatable supporting module as claimed in claim 1, further comprising an outer race holder, the outer race being securely coupled to the rotary plate using the outer race holder.

8. The rotatable supporting module as claimed in claim 1, further comprising a locking plate configured on the slidable plate for locking the second elongated part.

9. A gantry apparatus, comprising:
    a first guideway and a second guideway arranged in parallel with each other;
    a rotatable supporting module slidably mounted on the first guideway, the rotatable supporting module comprising
    a first rotary plate defining a first through hole;
    a first base arranged in the first through hole; and
    a first bearing arranged between the first rotary plate and the first base, the first bearing including a first inner race and a first outer race rotatable relative to the first inner race, the first inner race being securely coupled to the first base, the first outer race being securely coupled to the first rotary plate, whereby the first rotary plate is rotatable relative to the first base;

a slidable and rotatable supporting module slidably mounted on the second guideway, the slidable and rotatable supporting module comprising a second rotary plate defining a second through hole;

a second base arranged in the second through hole;

a second bearing arranged between the second rotary plate and the second base, the second bearing including a second inner race and a second outer race rotatable relative to the second inner race, the second inner race being securely coupled to the second base, the second outer race being securely coupled to the second rotary plate, whereby the second rotary plate is rotatable relative to the second base;

a slidable plate; and a sliding bearing including a first elongated part and a second elongated part juxtaposed with each other, the first elongated part being slidably engaged with the second elongated part, the first elongated part being securely coupled to the second rotary plate, the second elongated part being securely coupled to the slidable plate, whereby the slidable plate is slidable along a lengthwise direction of the first and second elongated parts of the sliding bearing; and a cross bar having opposite ends mounted on the rotatable supporting module and the slidable and rotatable supporting module.

10. The gantry apparatus as claimed in claim 9, further comprising a first inner race holder, the first inner race being securely coupled to the first base using the first inner race holder.

11. The gantry apparatus as claimed in claim 9, further comprising a first outer race holder, the first outer race being securely to the first rotary plate using the first outer race holder.

12. The gantry apparatus as claimed in claim 9, wherein a cover is mounted on the first outer race holder.

13. The gantry apparatus as claimed in claim 9, further comprising a second inner race holder, the second inner race being securely to the second base using the second inner race holder.

14. The gantry apparatus as claimed in claim 9, further comprising a second outer race holder, the second outer race being securely to the second rotary plate using the second outer race holder.

15. The gantry apparatus as claimed in claim 9, further comprising a locking plate configurable on the slidable plate for locking the second elongated part.

* * * * *

UNITED STATES PATENT AND TRADEMARK OFFICE
CERTIFICATE OF CORRECTION

PATENT NO. : 7,654,741 B2 Page 1 of 1
APPLICATION NO. : 11/309857
DATED : February 2, 2010
INVENTOR(S) : Cheng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 518 days.

Signed and Sealed this

Twenty-eighth Day of December, 2010

David J. Kappos
*Director of the United States Patent and Trademark Office*